United States Patent
Yang

(10) Patent No.: US 8,219,147 B2
(45) Date of Patent: Jul. 10, 2012

(54) MOBILE TERMINAL AND METHOD OF INDENTIFYING SIM CARD THEREOF

(75) Inventor: Wuding Yang, Shanghai (CN)

(73) Assignee: Spreadtrum Communications (Shanghai) Co., Ltd., Pudong District, Shanghai (CN)

( * ) Notice: Subject to any disclaimer, the term of this patent is extended or adjusted under 35 U.S.C. 154(b) by 746 days.

(21) Appl. No.: 12/334,446

(22) Filed: Dec. 13, 2008

(65) Prior Publication Data

US 2009/0156258 A1    Jun. 18, 2009

(30) Foreign Application Priority Data

Dec. 13, 2007    (CN) .......................... 2007 1 0172206

(51) Int. Cl.
*H04B 1/38*    (2006.01)
(52) U.S. Cl. ..................... 455/558; 455/422.1; 455/573; 455/572
(58) Field of Classification Search .................. 455/558, 455/422.1, 573, 572
See application file for complete search history.

(56) References Cited

U.S. PATENT DOCUMENTS 6,381,477 B1 *    4/2002    Johnson et al. ............... 455/572
2004/0127256 A1 *    7/2004    Goldthwaite et al. ........ 455/558
2006/0234693 A1 *    10/2006    Isidore et al. .............. 455/422.1

FOREIGN PATENT DOCUMENTS

DE    102005048510    *    4/2007

* cited by examiner

*Primary Examiner* — Jean B Jeanglaude

(57) ABSTRACT

A method of indentifying SIM card of a mobile terminal supports at least two SIM cards and comprises a power supply module and a power management module, wherein the power management module has different preset reference voltages and supplies power to the SIM cards respectively according to a comparison result of the reference voltages and operating voltages of the SIM cards. Via the preset reference voltages to the power management module, when the SIM card is inserted into the mobile terminal, the mobile terminal control the power supply module to supply power to the SIM cards, and the power management module determines whether the reference voltage matches the operating voltage of the SIM card, according to the comparison of the reference voltage and the operating voltage of the SIM card, so as to determine whether the SIM card can be indentified.

10 Claims, 2 Drawing Sheets

MOBILE TERMINAL AND METHOD OF INDENTIFYING SIM CARD THEREOF

BACKGROUND OF THE INVENTION

1. Field of Invention

The present invention relates to a mobile terminal and method of indentifying SIM card thereof, and more specifically to a mobile terminal supporting at least two SIM cards and method of indentifying the SIM cards thereof.

2. Description of Related Arts

Any discussion of the prior art throughout the specification should in no way be considered as an admission that such prior art is widely known or forms part of common general knowledge in the field.

The SIM (Subscriber Identity Module) card for mobile terminal, such as mobile phone, stores system original data inputted by the manufacturer, mobile phone information, information inputted by user, data relative to the mobile telecommunication network, and relevant service code, which are necessary to ensure the function of the mobile terminal.

SIM card is a chip card with a micro CPU, which has 5 modules inside thereof: a micro CPU (8 digit), a program ROM (3~8 kbit), a working RAM (6~16 kbit), a data EEPROM (16~256 kbit), and a serial communication unit. The 5 modules are sealed to the copper interface of the SIM card, and packaged like ordinary IC card. The SIM card connects the logical circuit thereof and mobile terminal via the copper interface of the SIM card. The SIM card has 8 pins, usually 6 of which are needed to connect with the mobile terminal.

The operating voltage of the SIM launched before 1998 is 5V. The SIM cards afterwards are compatible with 3V and 5V or compatible with 1.8V and 3V. The SIM card must cooperate with the mobile phone. That is to say, the power supply for SIM card of mobile phone must match the operating voltage of the SIM card. Otherwise, the mobile phone cannot indentify the SIM card, that is to say, the mobile phone cannot provide communication function. Besides, when the power supply of mobile phone is higher than the operating voltage of the SIM card, the SIM card may be burned. In order to solve this problem, a U.S. Pat. No. 6,381,477B1 discloses a method for protecting a circuit module in a communication device includes steps of: first detecting whether a circuit module is present in the communication device, measuring a supply voltage to the communication device, comparing the supply voltage to a predetermined threshold voltage, when the supply voltage is below the threshold, supplying normal functionality to the phone and returning to the comparing step, when the supply voltage is above the threshold, powering down a connection to the SIM card to limit functionality of the communication device. However, this method has drawbacks in compatibility and adaptability. For example, when the SIM card is compatible to two different operating voltages, this method can not assure that the SIM card work in the best operating voltage.

BRIEF SUMMARY OF THE INVENTION

An object of the present invention is to provide a method of indentifying SIM card of a mobile terminal, which adapts to different operating voltages.

In order to accomplish the object, a method of indentifying SIM card of a mobile terminal supporting at least two SIM cards and comprising a power supply module and a power management module, wherein the power management module has different preset reference voltages and supplies power to the SIM cards respectively according to a comparison result of the reference voltages and operating voltages of the SIM cards. Via the preset reference voltages to the power management module, when the SIM card is inserted into the mobile terminal, the mobile terminal control the power supply module to supply power to the SIM cards, and the power management module determines whether the reference voltage matches the operating voltage of the SIM card, according to the comparison of the reference voltage and the operating voltage of the SIM card, so as to determine whether the SIM card can be indentified.

Preferably, the power management module presets a first reference voltage, a second reference voltage and a third reference voltage, wherein the second reference voltage is more than the first and less than the third, wherein the power management module control the power supply module to supply power respectively from the first reference voltage to the second reference voltage and to the third reference voltage to the SIM card. The supply power increases from the lowest first reference voltage, to the second reference voltage and to highest the third reference voltage, so as to avoid the SIM card being burned by the high voltage supplied at the beginning.

Preferably, the indentifying method comprises the following steps. (S1) The power management module control the power supply module to supply power with the first reference voltage, and if the mobile terminal responds, compare the first reference voltage with the operating voltage of the SIM card, or go to S2. (S2) The power management module control the power supply module to increase power to the second reference voltage, and if the mobile terminal responds, compare the second reference voltage with the operating voltage of the SIM card, or go to S3. (S3) The power management module control the power supply module to increase power to the third reference voltage, and if the mobile terminal responds, compare the third reference voltage with the operating voltage of the SIM card, or prompt that the SIM card cannot be indentified. Through the above-mentioned steps, the SIM card of different operating voltages can be indentified in a corresponding step, so that the mobile terminal using this indentifying method can be compatible to the SIM cards of different operating voltages, so as to improve the adaptability of the mobile terminal.

Preferably, the S1, S2 and S3 further comprise a step of reading information of the SIM card and analyze the operating voltage of the SIM card.

Preferably, the S1, S2 and S3 further comprise a step of determining whether the reference voltage is consistent with the operating voltage of the SIM card, wherein when they are consistent, supply the reference voltage to the SIM cards, or the power management module controls the power supply module to increase the power supply to another reference voltage higher than the reference voltage. By increasing power supply step by step, the SIM card can be protected from being burned by high voltage.

Preferably, the first reference voltage is 1.8V, the second reference voltage is 3V, and the third reference voltage is 5V.

Preferably, the operating voltage of the SIM card is the best operating voltage. For the SIM card that is compatible to different operating voltage, the best operating voltage recognized in the information of the SIM card is believed to be the operating voltage.

More preferably, the operating voltage is 1.8V, 3V or 5V, which cover the present standard operating voltages of the SIM card, so as to ensure the adaptability of the mobile terminal.

Another object of the present invention is to provide a mobile terminal with SIM card compatible to different operating voltages.

Accordingly, the present invention provides a mobile terminal comprises a power supply module supplying power to at least two SIM cards, and a power management module for indentifying the SIM card according to the above-mentioned indentifying method. The mobile terminal can identify the SIM card of different operating voltages, and can support SIM cards of different operating voltages working normally, so as to ensure the communication of the mobile terminal.

Preferably, any SIM card supports GSM, GPRS, CDMA, WCDMA, or PHS technique, so that the SIM card of different technique can be supplied through one power management module, so as to simplify the system structure of the mobile terminal.

DETAILED DESCRIPTION OF THE INVENTION

Figure 1:
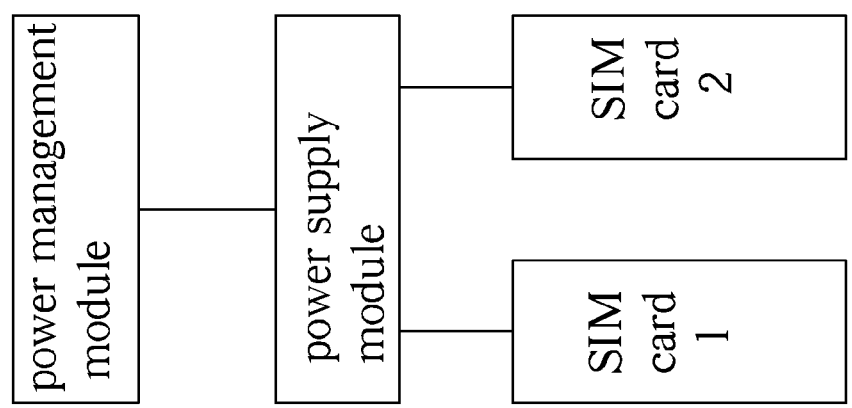
FIG. 1 is a schematic view of a mobile terminal according to a preferred embodiment of the present invention.
Figure 2:
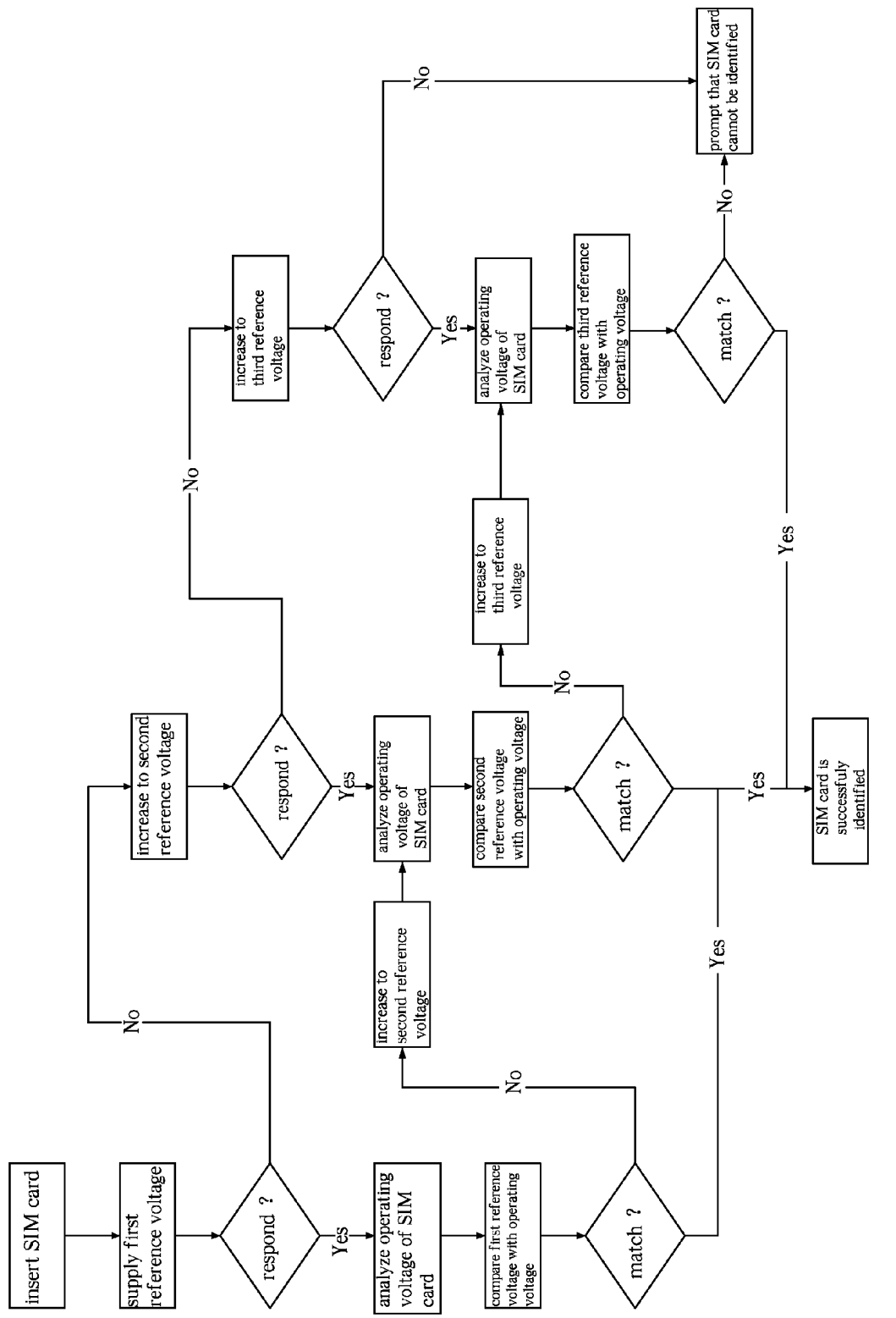
FIG. 2 is a flow chart of an identifying method according to the above preferred embodiment of the present invention.

Referring to FIGS. 1 and 2 of the drawings, the mobile terminal of the present invention comprises a power supply module and a power management module. The power supply module connects to at least two SIM card ports. The power management module has different preset reference voltages. Preferably, three different reference voltages are preset, which are the first reference voltage, the second reference voltage and the third reference voltage. The second reference voltage is between the first and the third, that is to say, the second reference voltage is more than the first and less than the third. More preferably, the first reference is 1.8V, the second is 3V, and the third is 5V so as to be consistent with the operating voltage of the current SIM card. After SIM card is inserted into the port, controlled by the power management module, the power supply module provides power to at least two SIM cards at the same time, and identifies the two SIM cards based on the judgment of the power management module. Based on the identification, the mobile terminal enters into the normal standby state or prompts the user that the SIM card can't be identified.

Referring to FIG. 2 of the drawings, the processing flow for identifying different operating voltages of the SIM cards is illustrated as follows.

When the SIM card is inserted, the power management module controls the power supply module to provide the first reference voltage to the SIM card, which means the power supply of the SIM card is 1.8V. If the mobile terminal responds, read the relative information from the SIM card and analyze the content thereof according to the relative protocol (referring to ISO7816-3) to determine whether the operating voltage of the SIM card is 1.8V. If the analysis result shows the operating voltage is 1.8V, the mobile terminal is believed to have successfully identified the SIM card and the terminal enters into a normal standby state. If the analysis result is that the operating voltage of the SIM card is not 1.8V, the power management module controls the power supply module to increase the power supply to the second reference voltage, which is 3V, and analyze the operating voltage of the SIM card. If the analysis result shows that the operating voltage of the SIM card matches the second reference voltage, the mobile terminal is believed to have successfully identified the SIM card and the terminal enters into a normal standby state. If the analysis result shows that the operating voltage of the SIM card is not 3V, the power management controls the power supply module to increase the power to the third reference voltage, which is 5V, and analyzes the operating voltage of the SIM card. If the analysis result is that the operating voltage of the SIM card matches the third reference voltage, the mobile terminal is believed to have successfully identified the SIM card and enters into a normal standby state. If the analysis result is that the operating voltage of the SIM card is not 5V, the operating voltage of the SIM card is believed not to match the voltage provided by the power supply module, and the mobile terminal can't identify the SIM card and prompt the user the SIM card can't be identified.

If the mobile terminal doesn't respond when the first reference voltage is supplied to the SIM card, the power management module controls the power supply module to increase the power to the second reference voltage, which is 3V. If the mobile terminal responds, read the relative information from the SIM card and analyze the content thereof according to the relative protocol (referring to ISO786-3) to determine whether the operating voltage of the SIM card is 3V. If the analysis result shows that the operating voltage is 3V, the mobile terminal is believed to have successfully identified the SIM card and enters into normal standby state. If the analysis result shows that the operating voltage of the SIM card is not 3V, the power management module controls the power supply module to increase the power to the third reference voltage, which is 5V, and analyzes the operating voltage of the SIM card. If the analysis result is that the operating voltage of the SIM card matches the third reference voltage, the mobile terminal is believed to have successfully identified the SIM card and enters into normal standby state. If the analysis result shows that the operating voltage is not 5V, the operating voltage of the SIM card is believed not to match the voltage provided by the power supply module, and the mobile terminal can't identify the SIM card and prompts the user that the SIM card can't be identified.

If the mobile terminal doesn't respond when the second reference voltage is supplied to the SIM card, the power management module controls the power supply module to increase the power to the third reference voltage, which is 5V. If the mobile terminal responds, read the relative information from the SIM card and analyze the content thereof according to the relative protocol (referring to ISO786-3) to determine whether the operating voltage of the SIM card is 5V. If the analysis result shows that the operating voltage is 5V, the mobile terminal is believed to have successfully identified the SIM card and enters into normal standby state. If the analysis result shows that the operating voltage of the SIM card is not 5V, the operating voltage of the SIM card is believed not to match the voltage provided by the power supply module, and the mobile terminal can't identify the SIM card and prompts the user that the SIM card can't be identified.

If the mobile terminal doesn't respond when the third reference voltage is supplied to the SIM card, the operating voltage of the SIM card is believed not to match the voltage provided by the power supply module, and the mobile terminal can't identify the SIM card and prompts the user that the SIM card can't be identified.

Through the above-mentioned identification method, the power supply module of the mobile terminal can be compatible to the different operating voltages of different SIM cards, so as to greatly improve the adaptability of the mobile terminal to all kinds of SIM cards with different operating voltages. The power supply is increased from low voltage to high voltage step by step to match the operating voltage of the SIM card, so as to effectively avoid the damage of the SIM card caused by the power supply with high voltage at the beginning. The identification method based on the invention is not only suitable for the mobile terminal that provides power to two GSM SIM card at the same time, but also suitable for the mobile terminals using other radio techniques, such GPRS, CDMA, WCDMA, and PHS, and also suitable for mobile terminals that provide power to different types of SIM cards of different radio techniques at the same time.

In addition, for the SIM card that is compatible with different operating voltages, the SIM card can work with power supply of different voltages. For example some SIM cards are compatible with 3V and 5V and some cards are compatible with 1.8V and 3V. When the system identify the operating voltage of the SIM card, the system read the relative information from the SIM card and analyzes the content thereof according to the relative protocol (referring to ISO7816-3) to select the best voltage as the operating voltage of the SIM card.

One skilled in the art will understand that the embodiment of the present invention as shown in the drawings and described above is exemplary only and not intended to be limiting. Any variation on the theme and methodology of accomplishing the same that are not described herein would be considered under the scope of the present invention.

What is claimed is:

1. A method of identifying a SIM card of a mobile terminal comprising a power supply module and a power management module, comprising the steps of:
   (A) presetting three different reference voltages in the power management module;
   (B) the power management module controlling the power supply module to supply a first reference voltage of the three different reference voltages to the SIM card, wherein when the mobile terminal responds, go to step (C), and when the mobile terminal does not respond, go to step (D);
   (C) determining whether an operating voltage of the SIM card is equal to the first reference voltage by comparing the operating voltage of the SIM card with the first reference voltage, wherein when the operating voltage of the SIM card is equal to the first reference voltage, the SIM card is successfully identified and the mobile terminal enters into a normal standby state, and when the operating voltage of the SIM card is not equal to the first reference voltage, go to step (D);
   (D) the power management module controlling the power supply module to supply a second reference voltage to the SIM card, wherein when the mobile terminal responds, go to step (E), and when the mobile terminal does not respond, go to step (F);
   (E) determining whether the operating voltage of the SIM card is equal to the second reference voltage by comparing the operating voltage of the SIM card with the second reference voltage, wherein when the operating voltage of the SIM card is equal to the second reference voltage, the SIM card is successfully identified and the mobile terminal enters into the normal standby state, and when the operating voltage of the SIM card is not equal to the second reference voltage, go to step (F);
   (F) the power management module controlling the power supply module to supply a third reference voltage to the SIM card, wherein when the mobile terminal responds, go to step (G), and when the mobile terminal does not respond, go to step (H);
   (G) determining whether the operating voltage of the SIM card is equal to the third reference voltage by comparing the operating voltage of the SIM card with the third reference voltage, wherein when the operating voltage of the SIM card is equal to the third reference voltage, the SIM card is successfully identified and the mobile terminal enters into the normal standby state, and when the operating voltage of the SIM card is not equal to the third reference voltage, go to step (H); and
   (H) determining that the SIM card can not be identified.

2. The method, as recited in claim 1, wherein the operating voltage is obtained by reading related information of the SIM card and analyzing the read information based on relative protocol.

3. The method, as recited in claim 2, wherein the second reference voltage is more than the first reference voltage and less than the third reference voltage.

4. The method, as recited in claim 3, wherein the first, second and third reference voltages are 1.8V, 3V and 5V, respectively.

5. The method, as recited in claim 4, wherein the operating voltage of the SIM card is a best operating voltage thereof.

6. The method, as recited in claim 5, wherein the operating voltage is 1.8V, 3V or 5V.

7. The method, as recited in claim 1, wherein the second reference voltage is more than the first reference voltage and less than the third reference voltage.

8. The method, as recited in claim 7, wherein the first, second and third reference voltages are 1.8V, 3V and 5V, respectively.

9. The method, as recited in claim 8, wherein the operating voltage of the SIM card is a best operating voltage thereof.

10. The method, as recited in claim 9, wherein the operating voltage is 1.8V, 3V or 5V.

* * * * *